United States Patent [19]

Peters

[11] 4,196,750
[45] Apr. 8, 1980

[54] PUSH-TYPE CONTROL VALVE FOR FLUID ACTUATOR

[75] Inventor: Clifford M. Peters, Longview, Tex.

[73] Assignee: W-K-M Wellhead Systems, Inc., Shreveport, La.

[21] Appl. No.: 876,970

[22] Filed: Feb. 13, 1978

[51] Int. Cl.² .............. F15B 13/04; F15B 13/042; F15B 15/26
[52] U.S. Cl. ............................ 137/625.66; 137/458
[58] Field of Search ................. 137/458, 625.66; 251/63

[56] References Cited

U.S. PATENT DOCUMENTS

| | | | |
|---|---|---|---|
| 3,877,484 | 4/1975 | Theriot et al. | 137/625.66 |
| 3,920,040 | 11/1975 | Powell | 137/458 |
| 3,943,974 | 3/1976 | Connelly et al. | 137/625.66 X |
| 4,004,610 | 1/1977 | Theriot | 137/625.68 X |
| 4,145,025 | 3/1979 | Bergeron | 251/63 |

*Primary Examiner*—Gerald A. Michalsky
*Attorney, Agent, or Firm*—Eugene N. Riddle

[57] ABSTRACT

A control valve for a fluid actuator has a slide valve mounted within a housing with an external gripping knob on one end and a piston on the other end. A spring engages the piston and continuously urges the slide valve and knob to an outer position. The knob is gripped and the slide valve is pushed inwardly for resetting the piston after the control valve has been actuated or fired to exhaust the fluid from the fluid actuator. Fluid from associated high and low pressure pilot valves holds the slide valve and piston in an inner position against the bias of the spring during normal operation of the fluid system.

4 Claims, 3 Drawing Figures

PUSH-TYPE CONTROL VALVE FOR FLUID ACTUATOR

BACKGROUND OF THE INVENTION

Heretofore, such as shown in prior U.S. Pat. No. 3,943,974 dated Mar. 16, 1976, control valves for fluid actuators have been provided in which fluid is quickly exhausted from a fluid valve actuator when the main flowline pressure reaches a high or low pressure outside the desired fluid pressure operating range. However, such prior control valves have utilized a slide valve and piston which have been urged continuously to an inner seated position. The prior control valves have been reset by pulling outwardly on the manual knob and a detent is then pushed inwardly to hold the slide valve in an outer position until the operating fluid pressure has built up a predetermined amount for release of the detent. During normal operation the slide valve is in an outer position with the upper portion of the slide valve outward of the housing exposed to the atmosphere. Many of these control valves are utilized in offshore facilities exposed to sea water and other conditions which offer prolonged use and time might permit the upper portion of the slide valve outside the housing and adjacent the knob to be coated with scales, crusts, or other types of foreign matter. This could impede or restrict the inward movement of the slide valve within the housing under certain conditions.

DESCRIPTION OF THE PRESENT INVENTION

The present invention is directed to a control valve for a fluid actuator in which an elongated housing has a bore therein with a slide valve mounted within the bore and having an external knob on an outer end for gripping. A piston is provided on the inner end of the slide valve and a spring within the bore urges the slide valve and knob outwardly to a seated position of the piston. A detent is provided to hold the slide valve inwardly against the bias of the spring in an unseated position of the piston when the slide valve is pushed inwardly by the knob. Thus, in operation with the detent released upon the building up of a predetermined pressure, the slide valve and the outer gripping knob remain in an inner position in the unseated position of the piston so that only a small portion of the slide valve between the knob and the elongated housing is exposed. When the slide valve moves to a seated position of the piston under the bias of the spring after an abnormally high or low pressure is reached in the main flowline being sensed, the outer end of the slide valve and knob move away from the housing.

Thus, the present invention provides an arrangement in which a slide valve in its operable position is pushed and held inwardly during normal operation so that the portion of the slide valve that is received within the elongated housing is not exposed to sea water and other conditions during normal operation. This minimizes any possible malfunctioning resulting from foreign matter or the like being formed or deposited on the portion of the slide valve outside the housing.

It is noted that for resetting the present control valve, the slide valve is pushed inwardly of the housing against the bias of the spring and is held in such position by the detent until the pressure which is exposed to the inner surface of the piston increases to a predetermined amount.

Figure 1:
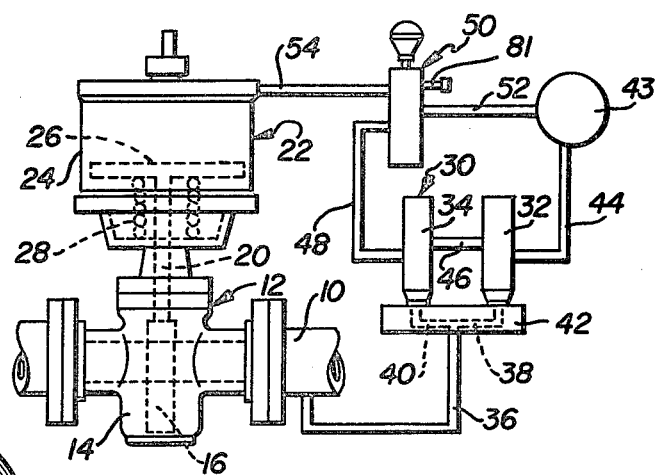
FIG. 1 is a diagrammatic view showing the system in which the present invention is employed with a fluid actuator and gate valve being controlled by the system.

Referring now to the drawings for a better understanding of this invention, and more particularly to FIG. 1, a main flowline indicated at 10 has a gate valve structure generally indicated at 12 therein. A gate valve body 14 has a slab gate 16 mounted therein for movement between open and closed positions relative to flowline 10. A stem indicated at 20 is connected to slab gate 16 and extends upwardly through a pneumatic actuator indicated generally at 22. Pneumatic actuator 22 includes a cylinder 24 having a piston 26 mounted therein and secured to stem 20 for reciprocal movement within cylinder 24. A spring 28 mounted within cylinder 24 continuously urges piston 26 and gate valve member 16 to a closed position.

A high-low pilot structure generally indicated at 30 includes a high pressure pilot 32 and a low pressure pilot 34. Pressure in flowline 10 is sensed through pilot line 36 and branch line 38 to high pressure pilot 32 and through branch line 40 to low pressure pilot 34. Pilots 32 and 34 are supported on a base 42. Each pilot 32 and 34 has a shiftable valve member therein and a spring urging the valve member in one direction. A fluid source 43, such as a pressurized cylinder of oxygen or nitrogen gas is connected by line 44 to high pressure pilot 32, thence by a connecting line 46 to low pressure pilot 34, and by line 48 to the control valve structure 50 which comprises the present invention. High pressure pilot 32 may be set to be actuated at a predetermined high pressure in flowline 10 and low pressure pilot 34 may be set to be actuated at predetermined low pressure in flowline 10. Thus, an operating fluid pressure range is provided between the low pressure at which low pressure pilot 34 is set and the high pressure at which high pressure pilot 32 is set. In the event the fluid pressure in flowline 10 reaches a pressure lower than the pressure at which low pressure pilot 34 is set, the pressurizing gas within line 46 to low pressure pilot valve 34 is interrupted and exhausted to atmosphere thereby to interrupt the fluid pressure in line 48 to control valve 50. Likewise, when a predetermined high pressure is reached outside the operating range at which high pressure pilot 32 is set, fluid in line 48 is exhausted to atmosphere thereby to interrupt the fluid pressure in line 48 to fluid control valve 50. For further details of the operation of pilot valve structure 30, reference is made to prior U.S. Pat. No. 3,043,331 issued July 10, 1962.

Fluid, preferably pressurized gas, is applied from source 43 through line 52 to control valve 50, and thence through line 54 to actuator 22. A pressurized gas is supplied continuously to actuator 22 as long as lines 52 and 54 are in fluid communication with each other through control valve 50. Piston 26 remains in the position shown in FIG. 1 in which slab gate 16 is in an open position as long as fluid is supplied to actuator 22. When the flow of fluid is interrupted by control valve 50 to line 54, fluid is exhausted from line 54 and cylinder 24 through control valve 50 as will be explained in detail later. When fluid is exhausted from cylinder 24, piston 26 moves to a closed position relative to flowline 10 thereby to shut off fluid flow through flowline 10.

Figure 2:
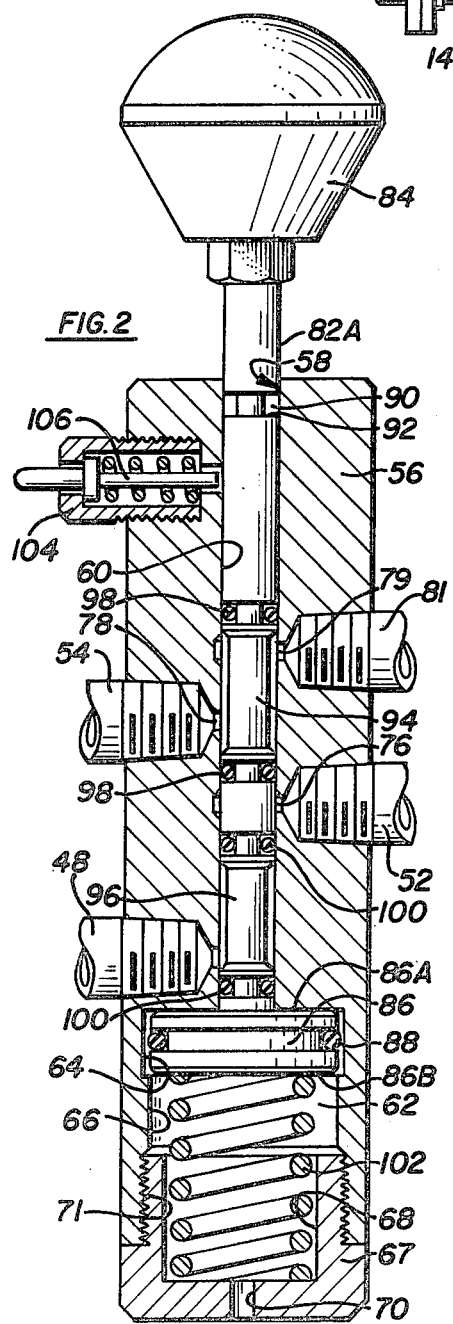
FIG. 2 is a sectional view of the control valve comprising the present invention with the piston being shown in an upper seated position against the bias of the spring with fluid from the actuator being exhausted.
Figure 3:
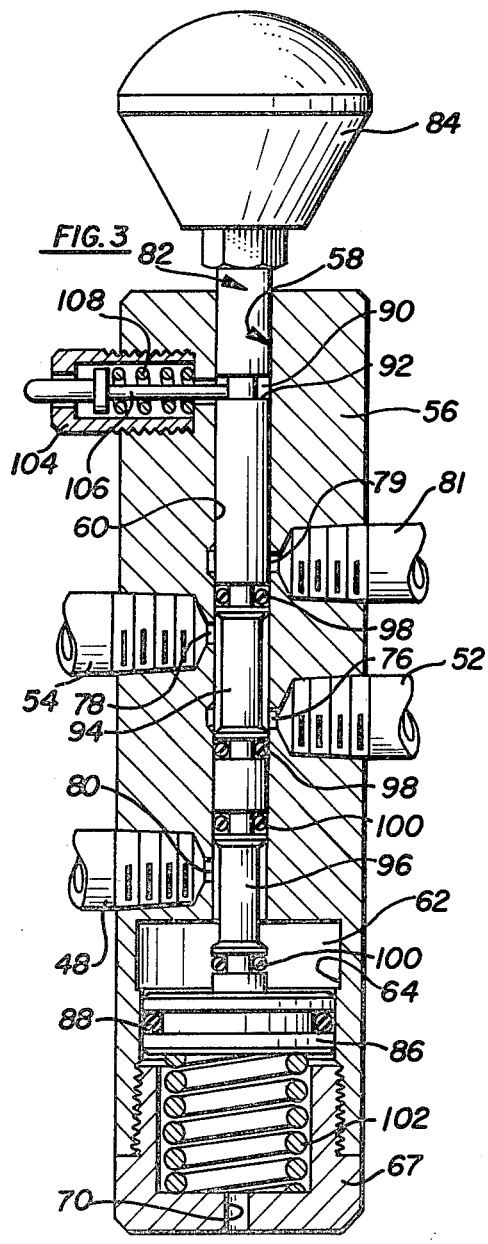
FIG. 3 is a sectional view similar to FIG. 2 but showing the piston and slide valve moved inwardly with the detent holding the slide valve in an inner position against the bias of the spring.

Referring now more particularly to FIGS. 2 and 3 in which control valve 50 comprising the present invention is shown in detail, a housing 56 forming the main body is provided and has a longitudinal bore generally indicated at 58. Bore 58 includes a small diameter main bore portion 60 which extends to a piston chamber defined by a large diameter bore portion generally indicated at 62. Piston chamber 62 has a large diameter chamber portion 64 adjacent its inner end and a small diameter chamber portion 66 adjacent its outer end. An externally threaded end plug 67 forms an intermediate diameter bore portion 68 and a vent 70 communicates with intermediate bore portion 68.

Housing 56 has an inlet port 76 therein in which line 52 is threaded. Inlet port 76 communicates with main bore 60. An outlet port 78 is formed in housing 56 and line 54 is connected thereto for supplying pressurized gas to actuator 22. Exhaust port 79 is in fluid communication with bore portion 60 and line 81 from port 79 exhausts to atmosphere. A port 80 in housing 56 communicates with line 48 from pilot valves 32 and 34, and fluid from line 48 is in fluid communication with piston chamber 62 in the position shown in FIG. 3.

A slide valve is generally indicated at 82 and has a knob 84 on its outer end which may be manually gripped for actuating slide valve 82 as will be explained. A piston generally indicated at 86 is on the inner end of slide valve 82 and is mounted within piston chamber 62 for movement between large diameter chamber portion 64 shown in FIG. 2 and the small diameter chamber portion 66 shown in FIG. 3. Piston 86 has an inner face 86A and an outer face 86B. Fluid from line 48 is exposed to inner face 86A in the position shown in FIG. 3. Piston 86 has an annular groove in its outer periphery and an O-ring 88 fits within the annular groove and seals against the inner surface defining small diameter piston chamber portion 66 in FIG. 3 but is spaced from the adjacent surface defining large diameter chamber portion 64 in the position shown in FIG. 2.

The main body of slide valve 82 has an annular groove 90 adjacent knob 84 and groove 90 defines a lower abutting surface or shoulder 92. Slide valve 82 has a pair of reduced diameter portions indicated at 94 and 96. Reduced diameter portion 94 is defined between spaced O-rings 98 in annular grooves about slide valve 82. Reduced diameter portion 96 is defined between O-rings 100 which fit in annular grooves about slide valve 82. A spring 102 mounted within intermediate diameter bore portion 68 contacts outer face 86B of piston 86 to urge continuously slide valve 82 to an outer position and piston 86 to a seated position.

FIG. 3 shows slide valve 82 in an inner position with piston 86 unseated in which position slide valve 82 remains until the fluid pressure in line 48 builds up to a predetermined amount. To retain slide valve 82 in the position of FIG. 3 until the operating pressure is reached, a cap 104 has a plunger or detent 106 mounted therein, and a spring 108 continuously urges detent 106 outwardly. The inner end of detent 106 engages abutment 92 and spring 102 urges abutment 92 into contact with the inner end of detent 106. For resetting slide valve 82 and holding slide valve 82 in position until the operating fluid pressure is reached, knob 84 is manually gripped and slide valve 82 is pushed inwardly against the bias of spring 102. Then detent 106 is manually pressed inwardly within groove 90 and release of knob 84 effects engagement of abutment 92 with detent 106 under bias of spring 102 to hold slide valve 82 in the position in FIG. 3. In this position fluid from line 48 is supplied to chamber 62 until the desired operating pressure is reached at which time spring 108 will remove detent 106 from engagement with abutment 92. Slide valve 82 and piston 86 are then in an operable position.

In operation, from the seated position of piston 86 shown in FIG. 2 with knob 84 and slide valve 82 in an outer position, fluid from line 54 is exhausted to atmosphere about reduced diameter portion 94 through the bleed or vent port 79 thereby to bleed gas from actuator 22 for movement of slab gate valve 16 to a closed position. For resetting piston 86 from the seated position of piston 86, knob 84 is gripped and slide valve 82 is pushed in against the bias of spring 102 and detent 106 is then manually depressed within groove 90. In the position of FIG. 3, upper O-ring 98 blocks fluid communication to vent port 79 and fluid is supplied from supply line 52 about reduced diameter portion 94 to line 54 and cylinder 24 to move piston 26 downwardly for opening slab gate 16. Slide valve 82 remains in the position in FIG. 3 with fluid being supplied also to chamber 62 from line 48 until the fluid pressure in line 48 reaches a predetermined high amount at which time the fluid pressure acting against face 86A of piston 86 moves piston 86 slightly inwardly which permits detent 106 to be removed from groove 90 under bias of spring 108. In this position, slide valve 82 is in an operable position and fluid pressure is maintained to actuator 22 to hold gate valve member 16 in an open position.

In the event high pressure pilot 32 or low pressure pilot 34 is actuated or fired by a respective high pressure or a respective low pressure in main flowline 10, the fluid in line 48 is exhausted to atmosphere by the fired pilot. When this occurs, piston 86 under the bias of spring 102 will move to the seated position shown in FIG. 2 for quickly exhausting gas from cylinder 24. Thus, piston 86 is quick acting upon bleeding of line 48 and fluid from cylinder 24 is quickly exhausted to atmosphere through bleed line 81.

It is noted that an upper end portion 82A of slide valve 82 adjacent knob 84 in the position in FIG. 2 is positioned outside of housing 56 and thus is in an exposed position to weather, foreign matter and the like which might collect around the outer surface of 82A. In the operable position of slide valve 82 shown in FIG. 3, only a very small portion of the upper end portion 82A is exposed as the major extent of 82A is received within housing 56 and is thus protected from exposure to foreign matter and the like which might collect around the outer surface of end portion 82A. Further, when slide valve 82 is in an operable position such as the position shown in FIG. 3 but with detent 106 removed from groove 90, any inadvertent weight on or depression of knob 84, such as a workman leaning against knob 84, will not result in a seating of piston 86. Thus, the present arrangement in which the slide valve of the present invention is reset by manually pushing in knob 84 and then having the slide valve in an inner position during operable position, exposes end portion 82A only in the inoperable seated position at which position slide valve 82 remains only a minimum of time until any malfunction is corrected and the system again placed in an operable position for monitoring main flowline 10.

Referring to FIG. 2 in which piston 86 is shown in a seated position, in the event fluid pressure in line 48 is provided or is increased, no movement of piston 86 will occur as the surface areas of reduced diameter portion 96 are balanced and lower O-ring 100 prevents piston face 86A from being exposed to the fluid pressure. Thus, even though the pilot fluid pressure system is energized after piston 86 is in a seated position, fluid is not supplied to actuator 22 since line 52 is not in fluid communication with line 54 as long as piston 86 remains in the seated position of FIG. 2. This is an important safety feature to prevent the reopening of valve 16 unless piston 86 is pushed down by knob 84.

What is claimed is:

1. A control valve for controlling fluid flow from a fluid source to a fluid actuator in response to pressure changes in a pilot line, said control valve comprising:

an elongate housing having an axial bore extending longitudinally thereof, said bore having an enlarged portion defining a piston chamber in the housing;

a slide valve mounted in said bore for longitudinal movement between a seated position and an unseated position, said slide valve having an outer end portion extending outwardly of the housing;

handle means on said outer end portion of the slide valve accessible for manual pushing of the slide valve inwardly from the seated to the unseated position to manually set the slide valve in the unseated position;

means urging said slide valve outwardly to the seated position thereof;

releasable detent means for temporarily holding the slide valve in its unseated position when manually set therein;

a pilot port intersecting the bore of said housing at a location adjacent said piston chamber, said pilot port communicating with said pilot line and said bore to apply the pilot line pressure to the piston chamber in the unseated position of the slide valve;

an enlarged portion of the slide valve providing a piston located in the piston chamber, said piston presenting a pressure surface facing toward the pilot port for receiving the pilot line pressure to hold the slide valve in its unseated position when the pilot line pressure is sufficiently high to overcome the force of said urging means;

additional port means comprising three additional ports intersecting the bore of said housing at longitudinally spaced locations thereof to apply fluid to the actuator from the fluid source when the slide valve is in its unseated position and to bleed fluid from the actuator when the slide valve is in its seated position, said pilot port intersecting the bore at a location between the piston and said additional port means;

a first seal element in said bore providing a fluid-tight seal between said pilot port and each of said additional ports at all positions of the slide valve to isolate the pilot line fluid from the fluid in said additional ports at all times; and a releasable second seal element in said bore carried on said slide valve and sealing against the housing at a location between said pilot port and piston chamber to prevent application of the pilot line pressure to the piston when the slide valve is in its seated position, said releasable second seal element moving into the piston chamber out of sealing engagement with the housing upon movement of the slide valve to its unseated position to permit fluid flow in the bore from said pilot port to said piston chamber for holding the slide valve in its unseated position.

2. A control valve as set forth in claim 1 wherein said first seal element is carried on said slide valve at a location between the pilot port and said additional port means.

3. A control valve as set forth in claim 1 wherein said inlet port intersects said bore at a location between said pilot port and said outlet port.

4. A control valve for controlling fluid communication between a fluid source and an actuator in response to pressure variations in a pilot line, said control valve comprising:

an elongate housing having a bore extending longitudinally thereof and an enlarged piston chamber at an inner end portion of the bore in fluid communication therewith;

a slide valve mounted in said bore for longitudinal movement and having a piston on an inner end portion thereof mounted within said piston chamber for movement between seated and unseated positions of the slide valve, means urging said slide valve outwardly to the seated position of the slide valve;

a pilot port in said housing adjacent said piston chamber, said pilot port communicating with said pilot line and with said bore to deliver pilot line fluid to the bore; an inlet port in said housing intersecting the bore at a location outwardly of said pilot port, said inlet port communicating with the fluid source and the bore to deliver incoming fluid from said source to said bore; an exhaust port in said housing intersecting the bore at a location outwardly of said inlet port, said exhaust port communicating with said bore to discharge fluid therefrom; an outlet port in said housing intersecting the bore at a location between said inlet and exhaust ports, said outlet port communicating with the actuator and the bore, said pilot port intersecting the bore at a location between the piston and said inlet, outlet, and exhaust ports;

said slide valve having a reduced diameter portion extending between the outlet and exhaust ports to provide fluid communication therebetween in the seated position of the slide valve, said reduced diameter portion extending between the inlet and outlet ports to provide fluid communication therebetween in the unseated position of the slide valve;

an outer end portion of said slide valve located outwardly of said housing and adapted to be manually pushed to push said slide valve inwardly in the housing from the seated position to the unseated position for manual setting of the slide valve;

a vent port in said housing offset from the remaining ports and communicating with said piston chamber at a location on an opposite side of the piston from said pilot port to vent fluid from the piston chamber upon movement of the piston toward the vent port;

means in said bore for sealing said pilot port from each of said inlet, outlet and exhaust ports at all positions of the slide valve between the seated and unseated positions; and further seal means in said bore sealing said pilot port from the piston chamber to prevent application of pilot line pressure to the piston when the slide valve is in its seated position, said further seal means permitting fluid flow from the pilot port to the piston chamber when the slide valve is in its unseated position, whereby pilot line pressure is applied to the piston to hold the slide valve in its unseated position.

* * * * *